United States Patent
Sood et al.

(10) Patent No.: US 12,114,223 B2
(45) Date of Patent: Oct. 8, 2024

(54) HANDOVERS BETWEEN 5G RADIO ACCESS NETWORKS AND IPV4 PUBLIC DATA NETWORK SESSIONS

(71) Applicant: T-Mobile USA, Inc., Bellevue, WA (US)

(72) Inventors: Romil Kumar Sood, Bothell, WA (US); Kunal Prakash Barawkar, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 18/500,054

(22) Filed: Nov. 1, 2023

(65) Prior Publication Data
US 2024/0064599 A1    Feb. 22, 2024

Related U.S. Application Data

(63) Continuation of application No. 17/680,127, filed on Feb. 24, 2022, now Pat. No. 11,877,202.

(51) Int. Cl.
*H04W 36/32* (2009.01)
*H04W 36/00* (2009.01)

(52) U.S. Cl.
CPC ....... *H04W 36/32* (2013.01); *H04W 36/0022* (2013.01); *H04W 36/0033* (2013.01)

(58) Field of Classification Search
CPC ......... H04W 36/0066; H04W 36/0033; H04W 36/0055; H04W 36/0083; H04W 36/32; H04W 36/0022; H04L 61/251; H04L 45/741
See application file for complete search history.

(56) References Cited

U.S. PATENT DOCUMENTS

| | | | |
|---|---|---|---|
| 6,466,571 B1 | 10/2002 | Dynarski et al. |
| 6,618,592 B1 | 9/2003 | Vilander et al. |
| 6,795,701 B1 | 9/2004 | Baker et al. |
| 6,804,720 B1 | 10/2004 | Vilander et al. |

(Continued)

FOREIGN PATENT DOCUMENTS

| | | |
|---|---|---|
| CN | 104468559 B | 7/2017 |
| CN | 108702593 B | 10/2021 |

(Continued)

*Primary Examiner* — Allahyar Kasraian
(74) *Attorney, Agent, or Firm* — Perkins Coie LLP (57) ABSTRACT

To facilitate a handover of mobile devices from $5^{th}$ Generation New Radio (5G) networks to $4^{th}$ Generation (4G) networks, an accessibility and mobility management function (AMF) of the 5G network core inactivates a data session in which the mobile device is assigned an Internet protocol version 6 (IPv6) address when the mobile device is to be assigned an IP version 4 (IPv4) address in the 4G network. The AMF generates a modified context of the mobile device that omits the IPv6 address of the device. The inactivation of the IPv6 session causes the mobile device to initiate a new data session with the 4G core network, in which the device will be assigned an IPv4 address for use on the 4G network. The modified context is used by the 4G network to configure communications for the mobile device without interrupting network service to the mobile device.

20 Claims, 6 Drawing Sheets

(56) References Cited

U.S. PATENT DOCUMENTS

| | | |
|---|---|---|
| 6,973,057 B1 | 12/2005 | Forsloew |
| 7,039,025 B1 | 5/2006 | Menon et al. |
| 7,158,497 B2 | 1/2007 | Li et al. |
| 7,170,879 B2 | 1/2007 | Kim |
| 7,266,371 B1 | 9/2007 | Amin et al. |
| 7,280,546 B1 | 10/2007 | Sharma et al. |
| 7,302,497 B2 | 11/2007 | Vilander et al. |
| 7,349,698 B2 | 3/2008 | Gallagher et al. |
| 7,450,544 B2 | 11/2008 | Rue |
| 7,471,655 B2 | 12/2008 | Gallagher et al. |
| 7,565,145 B2 | 7/2009 | Gallagher et al. |
| 7,573,846 B2 | 8/2009 | Rue et al. |
| 7,586,876 B2 | 9/2009 | Chung et al. |
| 7,606,190 B2 | 10/2009 | Markovic et al. |
| 7,644,171 B2 | 1/2010 | Sturniolo et al. |
| 7,653,039 B2 | 1/2010 | Lee et al. |
| 7,701,958 B2 | 4/2010 | Abrol et al. |
| 7,706,301 B2 | 4/2010 | Petrescu et al. |
| 7,760,666 B2 | 7/2010 | Jang et al. |
| 7,768,983 B2 | 8/2010 | Nylander et al. |
| 7,804,795 B2 | 9/2010 | Do et al. |
| 7,813,347 B2 | 10/2010 | Choi et al. |
| 7,826,405 B2 | 11/2010 | Shin et al. |
| 7,843,900 B2 | 11/2010 | Gallagher et al. |
| 7,912,021 B2 | 3/2011 | Barbaresi et al. |
| 8,036,222 B1 | 10/2011 | Huang et al. |
| 8,064,384 B2 | 11/2011 | Chen et al. |
| 8,160,020 B2 | 4/2012 | Eyuboglu et al. |
| 8,160,067 B2 | 4/2012 | Bedekar et al. |
| 8,165,090 B2 | 4/2012 | Nix |
| 8,165,091 B2 | 4/2012 | Nix |
| 8,165,102 B1 | 4/2012 | Meugels et al. |
| 8,166,519 B2 | 4/2012 | Chowdhury et al. |
| 8,190,191 B2 | 5/2012 | Livet et al. |
| 8,195,778 B1 | 6/2012 | Leung et al. |
| 8,228,843 B2 | 7/2012 | Sarikaya |
| 8,265,049 B2 | 9/2012 | Soelver |
| 8,279,872 B1 | 10/2012 | Huang et al. |
| 8,315,227 B2 | 11/2012 | Rydnell et al. |
| 8,345,625 B2 | 1/2013 | Park |
| 8,369,357 B2 | 2/2013 | Iyer et al. |
| 8,391,241 B2 | 3/2013 | Vikberg et al. |
| 8,406,195 B2 | 3/2013 | Rahman |
| 8,411,657 B2 | 4/2013 | Rahman |
| 8,462,696 B2 | 6/2013 | Vesterinen et al. |
| 8,462,785 B2 | 6/2013 | Woo |
| 8,494,543 B2 | 7/2013 | Koodli et al. |
| 8,498,251 B2 | 7/2013 | Kim et al. |
| 9,148,847 B2 | 9/2015 | Sen et al. |
| 9,596,707 B2 | 3/2017 | Zhu et al. |
| 9,621,598 B2 | 4/2017 | Das et al. |
| 9,661,544 B2 | 5/2017 | Jamadagni et al. |
| 9,686,231 B2 | 6/2017 | Yu |
| 9,756,533 B2 | 9/2017 | Mestanov et al. |
| 9,763,148 B2 | 9/2017 | Wong et al. |
| 9,807,819 B1 | 10/2017 | Zhu et al. |
| 9,876,670 B2 | 1/2018 | Richardson |
| 9,888,375 B2 | 2/2018 | Zisimopoulos et al. |
| 10,764,721 B1 | 9/2020 | Huang et al. |
| 2002/0023162 A1 | 2/2002 | Ahn et al. |
| 2003/0185177 A1 | 10/2003 | Chitrapu et al. |
| 2003/0208602 A1 | 11/2003 | Bhalla et al. |
| 2003/0216140 A1 | 11/2003 | Chambert |
| 2004/0081128 A1 | 4/2004 | Fiter et al. |
| 2004/0184465 A1 | 9/2004 | Lee et al. |
| 2006/0159100 A1 | 7/2006 | Droms et al. |
| 2006/0268900 A1 | 11/2006 | Larsson et al. |
| 2007/0091862 A1 | 4/2007 | Ioannidis |
| 2007/0268919 A1 | 11/2007 | Sarikaya et al. |
| 2008/0240037 A1 | 10/2008 | Bedekar et al. |
| 2008/0242298 A1 | 10/2008 | Nylander et al. |
| 2009/0240795 A1 | 9/2009 | Tsirtsis et al. |
| 2009/0290556 A1 | 11/2009 | Taaghol |
| 2011/0039562 A1 | 2/2011 | Balasubramanian et al. |
| 2011/0182206 A1 | 7/2011 | Cherian et al. |
| 2011/0194530 A1 | 8/2011 | Tinnakornsrisuphap et al. |
| 2011/0264775 A1 | 10/2011 | Lee et al. |
| 2011/0292857 A1 | 12/2011 | Sarikaya et al. |
| 2015/0103804 A1 | 4/2015 | Gao et al. |
| 2017/0251393 A1 | 8/2017 | Cui et al. |
| 2017/0265057 A1 | 9/2017 | Zhang et al. |
| 2020/0146109 A1 | 5/2020 | Majmundar et al. |
| 2020/0280892 A1* | 9/2020 | Chen .................... H04W 36/00 |
| 2020/0305211 A1 | 9/2020 | Foti et al. |
| 2020/0374765 A1 | 11/2020 | Zong et al. |
| 2021/0105196 A1* | 4/2021 | Dao .................... H04L 43/026 |
| 2021/0289402 A1 | 9/2021 | Ke et al. |
| 2022/0116854 A1 | 4/2022 | Vidyashankar et al. |
| 2023/0224380 A1 | 7/2023 | Park et al. |

FOREIGN PATENT DOCUMENTS

| | | |
|---|---|---|
| EP | 2993868 B1 | 7/2019 |
| KR | 100671334 B1 | 1/2007 |
| KR | 100695400 B1 | 3/2007 |
| KR | 100711313 B1 | 4/2007 |
| KR | 100736536 B1 | 7/2007 |
| WO | 2010121495 A1 | 10/2010 |
| WO | 2019109260 A1 | 6/2019 |

* cited by examiner

HANDOVERS BETWEEN 5G RADIO ACCESS NETWORKS AND IPV4 PUBLIC DATA NETWORK SESSIONS

CROSS-REFERENCE TO RELATED APPLICATIONS

This application is a continuation of U.S. patent application Ser. No. 17/680,127, filed on Feb. 24, 2023, entitled HANDOVERS BETWEEN IPV4 PUBLIC DATA NETWORK SESSIONS AND 5G RADIO ACCESS NETWORKS, which is hereby incorporated by reference in its entirety.

BACKGROUND

As 5th Generation New Radio (5G NR) telecommunications networks are rolled out, many geographic areas are covered by a patchwork of 5G network coverage and 4th Generation Long-Term Evolution (4G LTE) network coverage. Mobile devices moving around within this patchwork of coverage areas are often handed off from one radio access network (RAN) to another. These handovers can include handing off a mobile device from one 5G RAN node (e.g., gNB) to another 5G node, from one 4G RAN node (e.g., eNB) to another 4G node, from a 5G node to a 4G node, or from a 4G node to a 5G node.

Mobile devices operating in a telecommunications network are assigned Internet protocol (IP) addresses that enable the devices to communicate over IP networks. 4G networks support both IP version 4 (IPv4) and IP version 6 (IPv6) addresses, while 5G networks support only IPv6. As a result, there are times that a mobile device assigned an IPv4 address in a 4G network will attempt to transfer to a 5G network, only for the handover to fail due to the unsupported IPv4 address by the 5G network. These failed handovers can impact performance of both the mobile devices and the 5G core network, including causing dropped calls or interrupted data sessions at the mobile devices and unnecessarily occupying resources of the 5G network as handover signaling is performed within the network.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The different versions of Internet protocol (IP) addresses supported within 4G and 5G telecommunications network can cause handover of mobile devices from a 4G RAN to a 5G RAN to fail. To ensure that a mobile device assigned an IPv4 address by the 4G network can be handed off to a 5G network without losing the context of the mobile device's session with the 4G network, the inventors have conceived and reduced to practice a facility to transfer mobile devices from one radio access technology (RAT) to another when the second RAT does not support the mobile device's assigned IP address.

According to implementations herein, a mobility management entity (MME) of the 4G network core facilitates transfer of a mobile device to a 5G network by inactivating the mobile device's IPv4 data session and generating a modified context of the mobile device that omits the IPv4 address of the device. As a result, the mobile device is able to initiate a new data session with the 5G core network, in which the device will be assigned a new IPv6 address for use on a data network. The modified context is used by the 5G network to configure communications for the mobile device without interrupting network service to the mobile device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples. For example, while the discussion herein provides examples of handover from a 4G network to a 5G network, one of skill in the art would understand that the disclosure herein can be applied to handover from a first network to a second network with one or more incompatible address schemes.

Wireless Communications System

Figure 1:
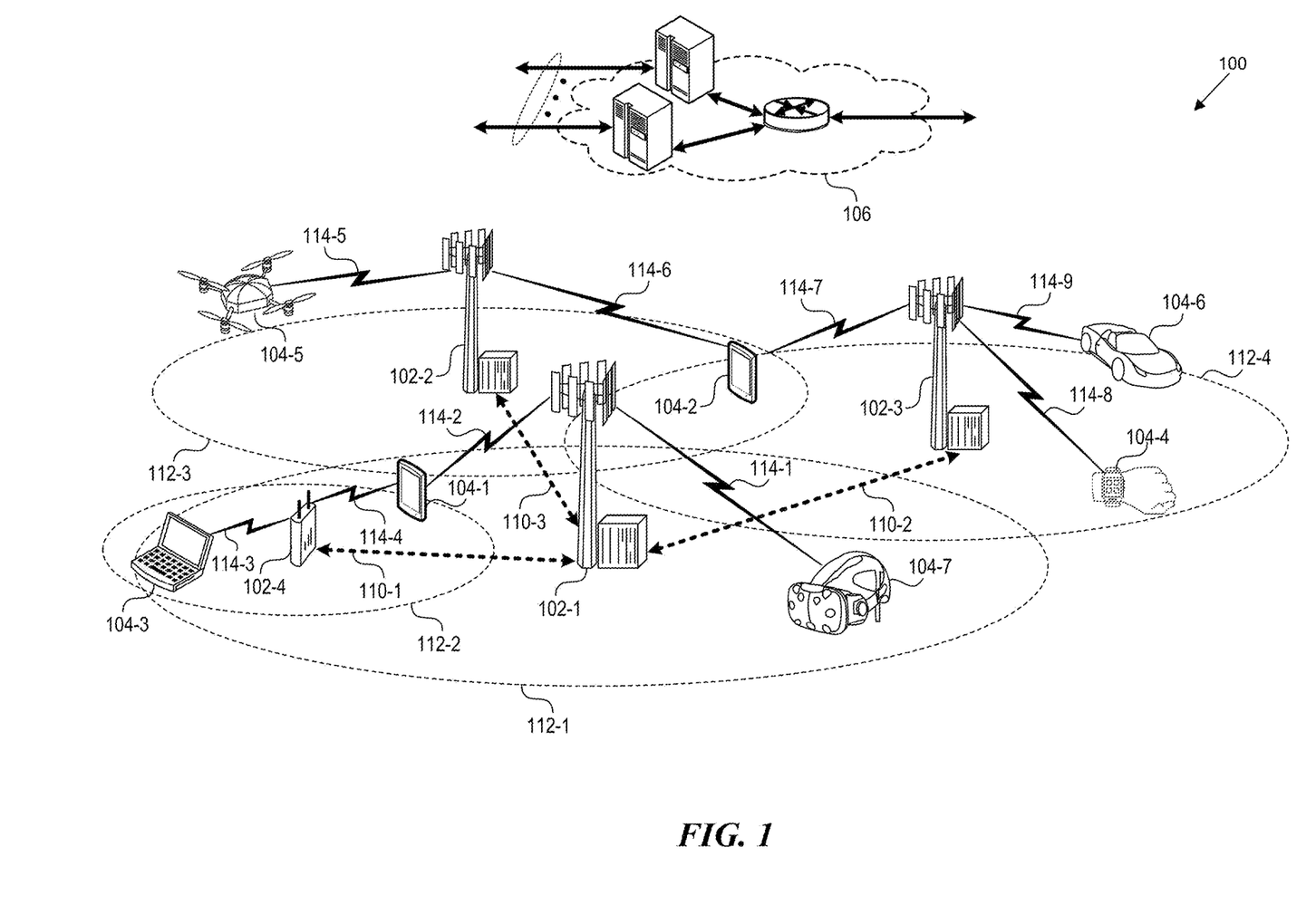
FIG. 1 is a block diagram that illustrates a wireless communications system that can implement aspects of the present technology in some implementations.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
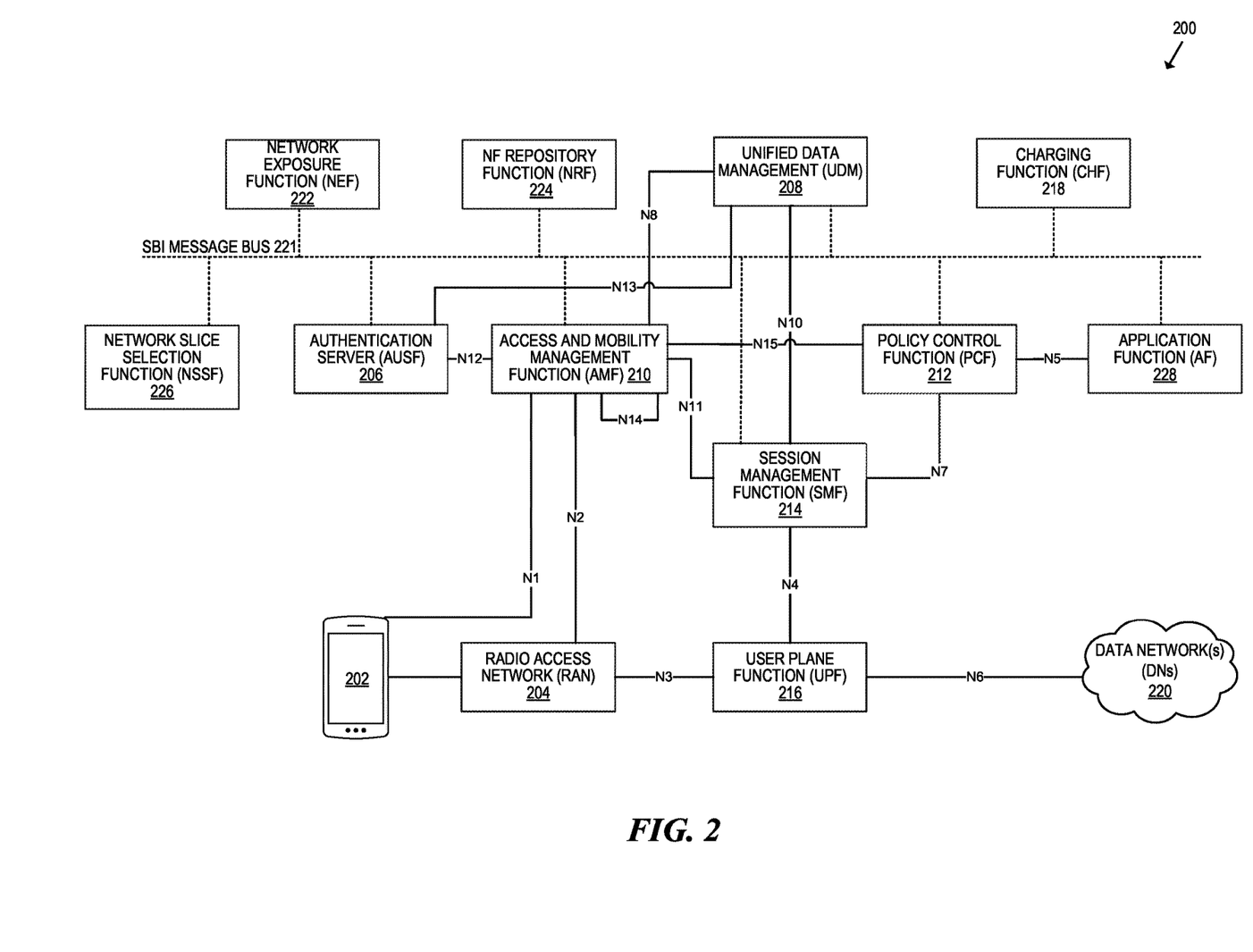
FIG. 2 is a block diagram that illustrates 5G core network functions (NFs) that can implement aspects of the present technology in some implementations.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

4G Core Network Functions

Figure 3:
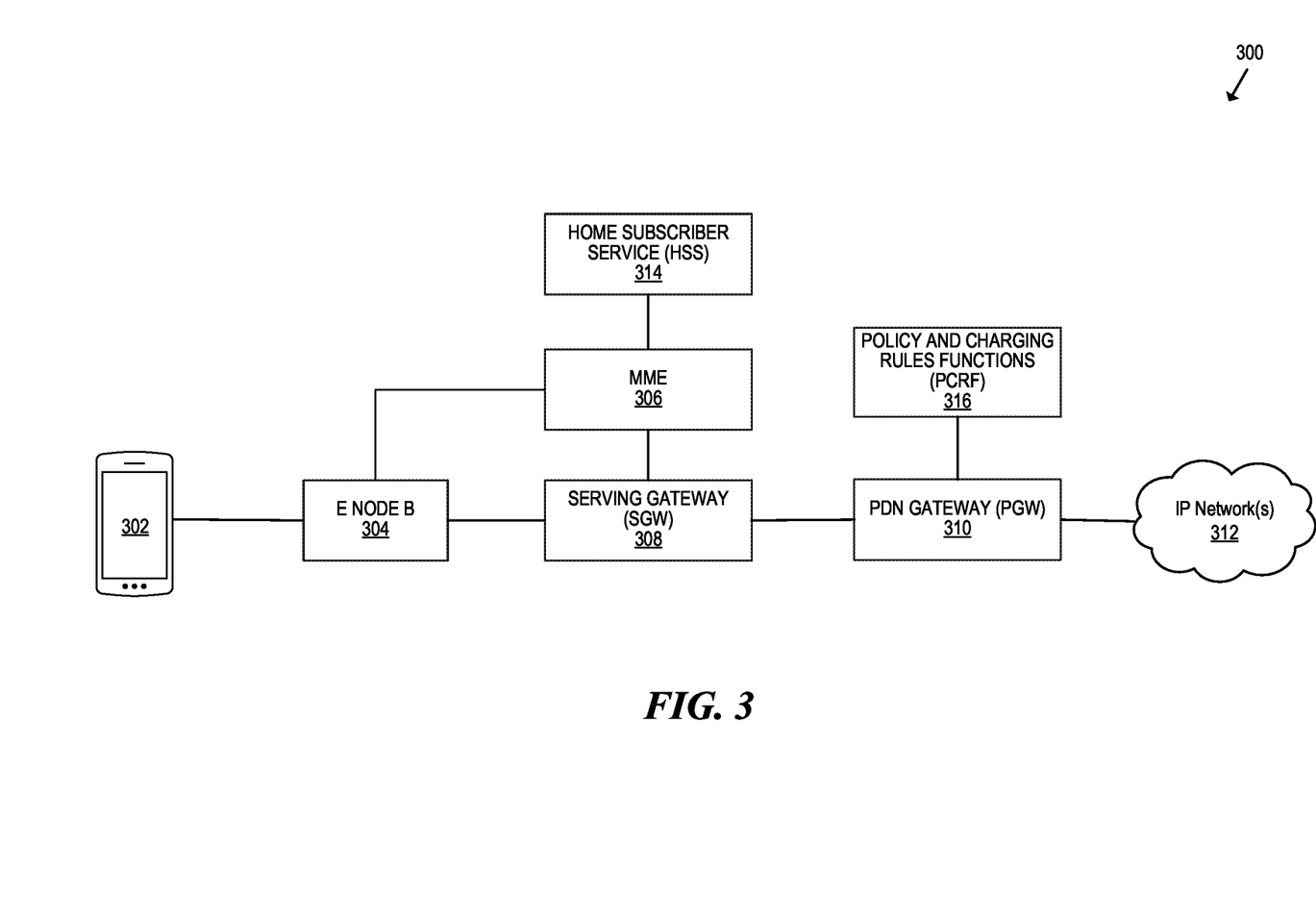
FIG. 3 is a block diagram that illustrates an architecture including 4G core functions that can implement aspects of the present technology in some implementations.

FIG. 3 is a block diagram that illustrates an architecture 300 including 4G core functions that can implement aspects of the present technology. A wireless device 302 can access the 4G network through a NAN (e.g., eNodeB 304) of a RAN. The functions of the 4G architecture include a mobility management entity (MME) 306, a serving gateway (SGW) 308, a packet data network gateway (PDN gateway or PGW) 310, a home subscriber service (HSS) 314, and policy and charging rules functions (PCRF) 316. These components can reside on nodes within a core packet-switched network operated by an LTE service provider, and their functionality can be split onto different physical nodes or merged onto shared-functionality nodes. Communications between the components can be enabled by interfaces such as virtual tunnels that are defined by relevant standards.

The MME 306 provides mobility and session management to UEs. Operating as a network controller, the MME 306 can establish and maintain bearers as well as establish connection and security between the UE and the 4G core network. The HSS 314 stores data for customer profiles and creates authentication vectors for use by the MME 306.

Each NAN 304 has a communication interface with the SGW 308, which in turn has a communication interface with the PGW 310 that provides connectivity with an IP network 312 such as the Internet. The SGW 308 routes and forwards user data packets to or from the UE. The SGW 308 can furthermore facilitate handovers of the UE from the 4G network to another 4G network, or from the 4G network to a 5G network when the UE is assigned an IPv6 address within the 4G network.

The PGW 310 provides a UE with access to a PDN by assigning an Internet protocol (IP) address to the UE. In an LTE network, the PGW 310 can assign addresses based on both IP version 4 (IPv4) and IP version 6 (IPv6). The PGW 310 can further perform functions such as policy enforcement, packet filtering, and charging as packets are routed from the UE to the IP network 312 or from the IP network 312 to the UE. Quality of service information used by the PGW 310 can be supplied by the PCRF 316, including charging rules, flow control rules, or traffic priority.

Managing Inter-RAT Transfer of User Equipment

Each NAN in a radio access technology (RAT) network typically covers a relatively small geographic area, such that user equipment frequently transfers from one NAN to another as the UE moves or as the coverage area or availability of a NAN changes. At times, the transfer of a UE from one NAN to another entails handing over the UE from a first network to a second network, where the UE is assigned a first address in the first network that is incompatible with the second network. In these cases (which include, by way of example, an inter-RAT handover to pass a UE from a 4G network to a 5G network), a modified handover process is needed to ensure that performance of the UE or the 5G network is not impeded by IPv4 addresses that are unsupported in the 5G network.

Figure 4A:
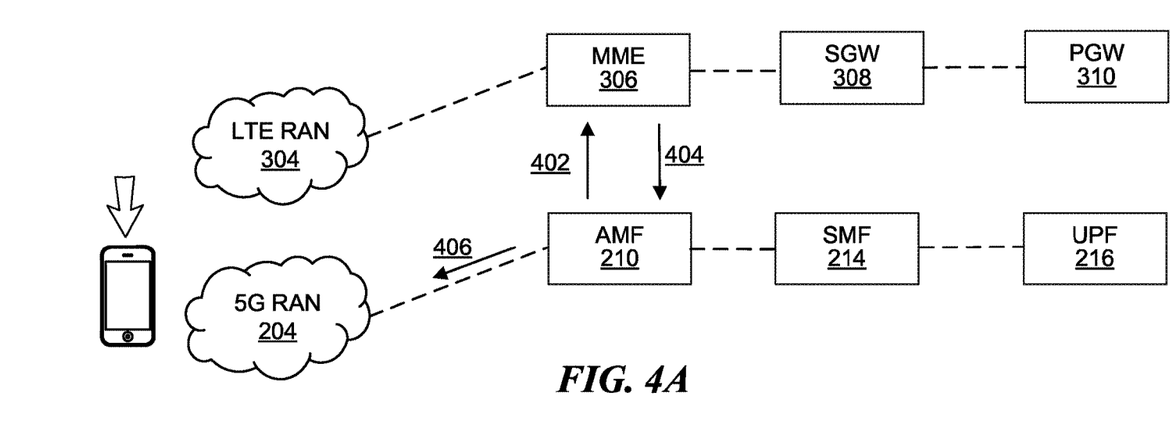
FIGS. 4A-4B illustrate a process for transferring a UE from a 4G network to a 5G network when the device is assigned an IPv4 address in the 4G network in some implementations.
Figure 4B:
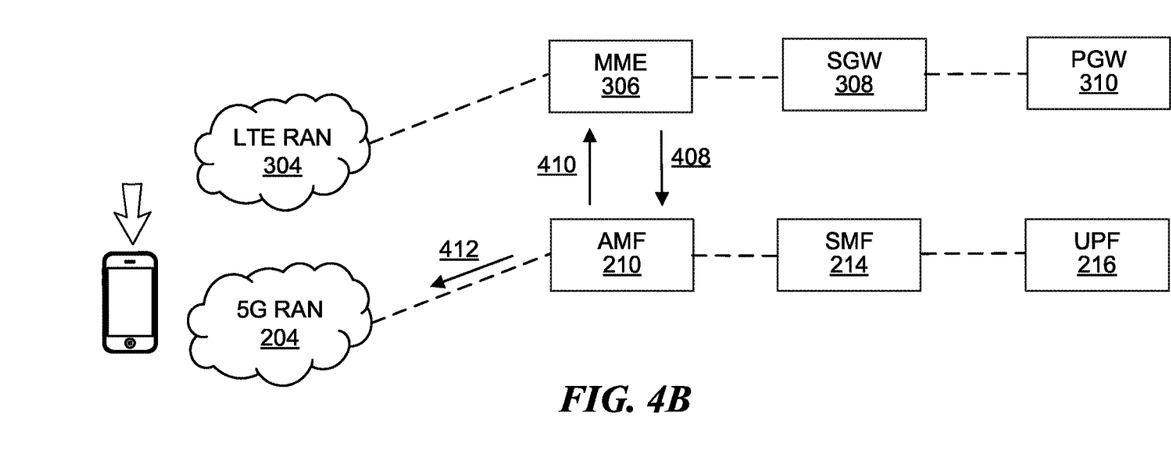

FIGS. 4A-4B illustrate a process for transferring a UE from a 4G network to a 5G network when the device is assigned an IPv4 address in the 4G network. In particular, FIG. 4A illustrates a handover when the UE is operating in an idle mode (e.g., with no active data session in progress at the time of the handover), and FIG. 4B illustrates a handover when the UE is operating in a connected mode (e.g., on an active call or actively transmitting or receiving IP data). As shown in FIGS. 4A and 4B, the handover is performed based on interactions between a NAN (e.g., eNB 304), an MME 306, an SGW 308, and a PGW 310 within a 4G network, and a NAN (e.g., gNB 204), an AMF 210, an SMF 214, and a UPF 216 of a 5G network. While operations are described herein for simplicity as being performed by various network functions within the 4G and 5G networks, these operations should be understood as being performed by hardware systems and associated instruction sets that implement the corresponding network functions. The 4G and 5G networks can be operated by the same service provider or by different service providers (e.g., such that the UE is treated as a roaming device by at least one of the core networks).

The handover can be initiated by the eNB 304 with which the UE communicates in the 4G network or by the gNB 204 with which the UE communicates in the 5G network. For example, the eNB initiates the handover when a received signal strength measured by the UE has fallen below a threshold value. When a handover is needed, the eNB sends a request to the MME 306 to hand off the UE to a NAN for which the received signal strength at the UE is greater. The process shown in FIGS. 4A-4B illustrates communications when the NAN targeted by the handover is the gNB 204 within a 5G network.

In an idle mode, as illustrated in FIG. 4A, the AMF 210 can first transmit a request for context of a UE to the MME 306, as indicated by communication 402. The request for context can be initiated when the UE attempts to connect to the 5G network and initiates a connection request that is passed to the AMF by the gNB 204. The context of the UE, as requested by the AMF 210 at communication 402, can include any information relevant to the UE or its current session within the LTE network. For example, the context can include the UE's IP address, the UE's international mobile subscriber identity (IMSI), an identity of the MME, security context of the UE, UE network capability, aggregate maximum bit rate (AMBR) configured for the UE by the LTE operator, selected core network operator identifier, access point name (APN) restriction value indicative of a type of application data the UE is configured to send, and/or an evolved packet system (EPS) bearer context.

In response to the communication from the AMF 210, the MME 306 releases the IPv4 address assigned to the UE. When releasing the IP address, the MME 306 can perform cleanup by deleting a mapping between the UE and IPv4 address stored at the MME 306, as well as notifying the PGW 310 that the IP address assigned to the UE should be released. The MME 306 returns the requested context to the AMF 210, as indicated by communication 404.

The AMF 210 returns a notification to the UE, at communication 406, that informs the UE that its PDU status for IPv4 is inactive. As a result, the UE can initiate a new PDU with the 5G core network, in which the UPF 216 or SMF 214 will assign the UE a new, IPv6 address for use in the data network. Furthermore, by inactivating the IPv4 address, the AMF 210 does not forward a separate session management request to the SMF 214 for the unsupported IPv4 session. Since the IPv4 address would be rejected by the SMF 214, the inactivation of the address improves signaling within the 5G network by eliminating the session management requests that are known to fail.

The connected mode handover illustrated in FIG. 4B can include operations and signaling similar to that employed in the idle mode. However, in the connected mode, the handover can begin with communication 408, in which the MME 306 sends a relocation request to the AMF 210. When a handover is performed for UEs assigned IPv6 addresses within the LTE network, the relocation request generated by the MME 306 provides a context of the UE that includes the UE's assigned IPv6 address. Similarly, an IPv4 address can be included in a relocation request generated by the MME 306 when handing off a UE from the 4G NAN to another 4G NAN that supports IPv4. In contrast, when a handover to a 5G NAN is performed for a UE assigned an IPv4 address, the relocation request generated by the MME 306 provides context of the UE but omits the IPv4 address.

At communication 412, the AMF 210 sends a forward relocation response to the MME 306 to notify the MME as to bearer status for each bearer (e.g., fail or successful), as well as the tunnel identifiers needed to create a temporary forwarding tunnel for the UE between the SGW 308 and the UPF 216.

When the AMF 210 receives the relocation request without an IP address, the AMF returns a notification to the UE, indicated by communication 412, that informs the UE that its PDU status for IPv4 is inactive. Like the communication 406 described with respect to FIG. 4A, this notification causes the UE to initiate a new PDU with the 5G network core to receive a new IPv6 address.

Whether in the connected mode or idle mode, the context transferred by the MME 306 enables the receiving NAN to establish the context of the UE. For example, the gNB 204 establishes the EPS bearers and the security context applicable to the UE. As a result, the UE can continue an active call or data session without interruption.

Figure 5A:
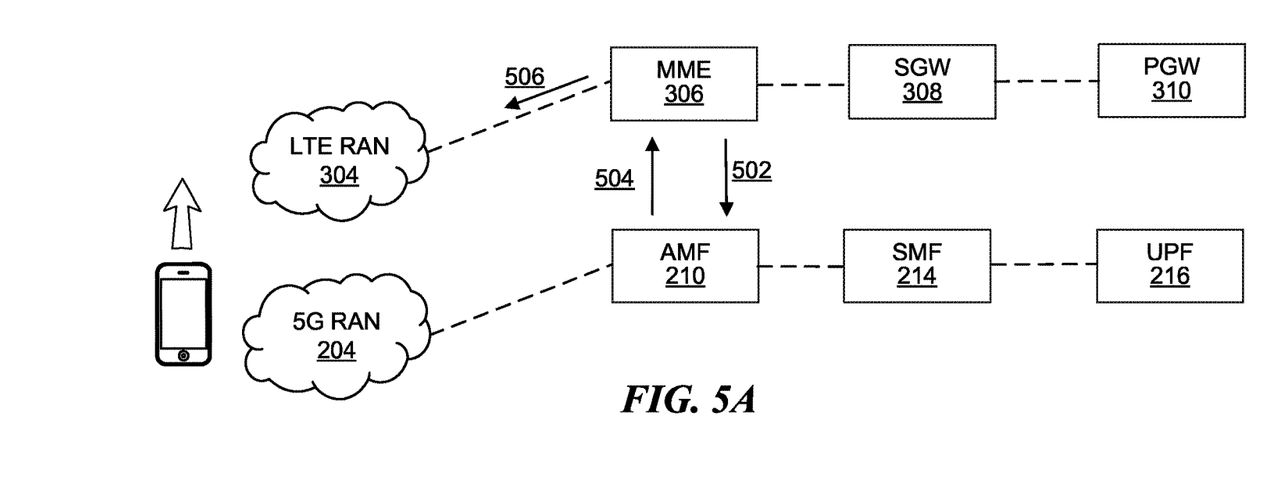
FIGS. 5A-5B illustrate a process for transferring a UE from a 5G network to a 4G network when the device is assigned an IPv4 address in the 4G network in some implementations.
Figure 5B:
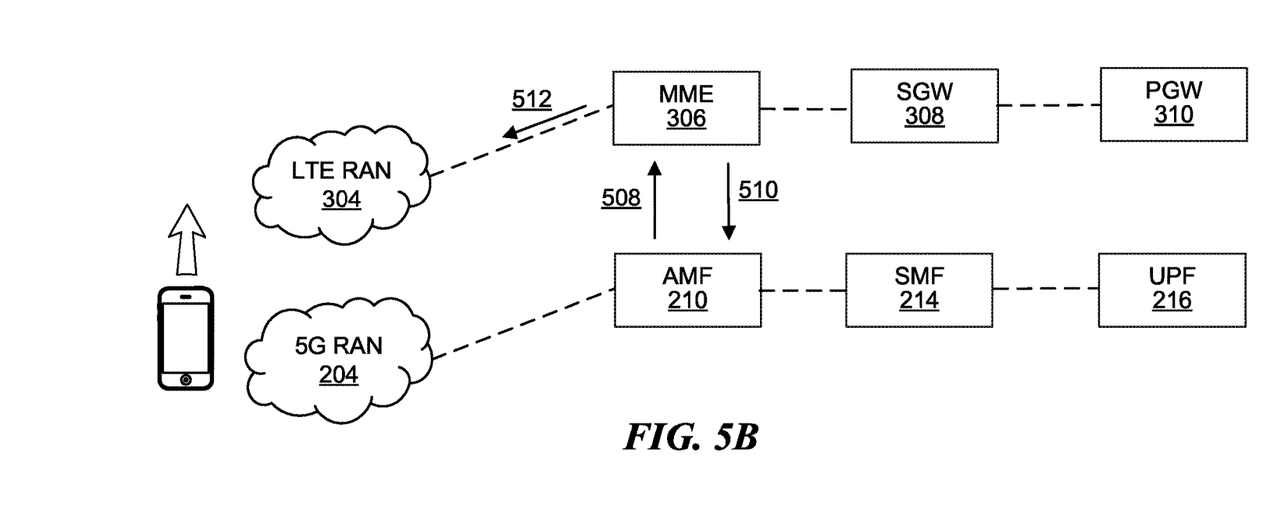

FIGS. 5A-5B illustrate respective processes for the reverse of those shown in FIGS. 4A-4B, namely transferring a UE from a 5G network to a 4G network. FIG. 5A illustrates a handover when the UE is operating in an idle mode while FIG. 5B illustrates a handover when the UE is operating in a connected mode.

As shown in FIG. 5A, the MME 306 can first transmit a request for context of a UE to the AMF 210, as indicated by communication 502. In response to the communication from the MME 306, the AMF 210 releases the IP address assigned to the UE and performs cleanup by deleting a mapping between the UE and IP address stored at the AMF 210. The AMF 210 also notifies the SMF 214 and/or UPF 216 that the IP address assigned to the UE should be released. The AMF 210 returns the requested context to the MME 306, as indicated by communication 504.

The MME 306 returns a notification to the UE, at communication 506, that informs the UE that its PDU status is inactive. As a result, the UE can initiate a new PDU with the 4G network, in which the PGW 310 will assign the UE a new, IPv4 address for use in the data network.

In the connected mode handover from 5G to 4G, shown in FIG. 5B, the AMF 210 sends a relocation request to the MME 306 at communication 508. The relocation request generated by the AMF 210 can provide context of the UE but omit the IP address assigned to the UE in the 5G network.

When the MME 306 receives the relocation request without an IP address, the MME 306 returns a notification to the UE, indicated by communication 512, that informs the UE that its PDU status for IP is inactive. The UE is correspondingly caused to initiate a new PDU with the 4G network core to receive a new IP address.

Computer System

Figure 6:
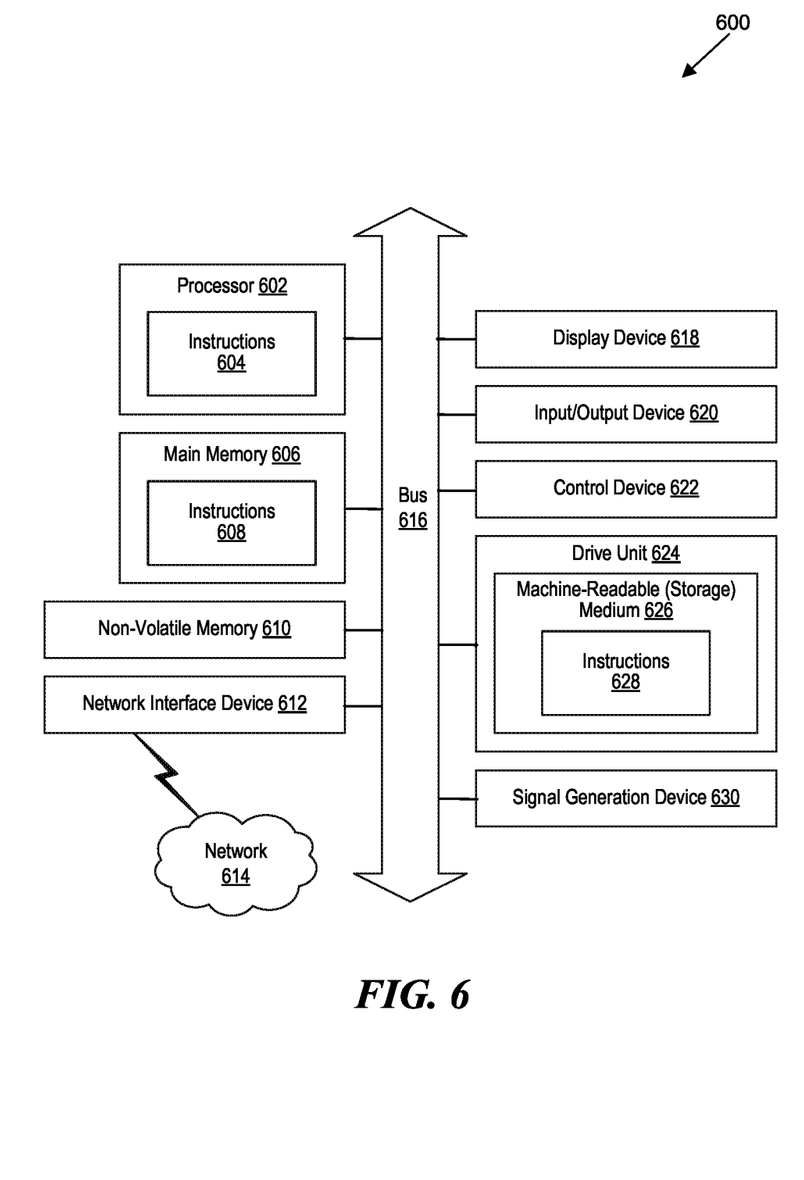
FIG. 6 is a block diagram that illustrates an example of a computer system in which at least some operations described herein can be implemented in some implementations.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory computer-readable storage medium carrying instructions, which, when executed by at least one data processor of a system, cause the system to:
   receive a communication indicating a request by user equipment (UE) to transfer from:
     (i) a communication session with a gNodeB (gNB) associated with a 5th Generation New Radio (5G NR) telecommunications network in which the UE is assigned an Internet protocol version 6 (IPv6) address to enable communications by the UE in a packet data unit (PDU) session, to
     (ii) a communication session with an eNodeB (eNB) associated with a 4th Generation Long-Term Evolution (4G LTE) telecommunications network, in which the UE is assigned an Internet protocol version 4 (IPv4) address;
   transfer a context of the UE to a mobility management entity (MME) associated with the 4G LTE telecommunications network that does not include the IPv6 address assigned to the UE,
     wherein the context causes the MME to notify the UE that the IPv6 PDU session is inactive and to facilitate initiation of an IPv4 packet data network (PDN) session with a core network of the 4G LTE network; and release the IPv6 address assigned to the UE.

2. The non-transitory computer-readable storage medium of claim 1, wherein the 4G telecommunications network and the 5G telecommunications network are operated by a same network service provider.

3. The non-transitory computer-readable storage medium of claim 1, wherein the 4G telecommunications network is operated by a different network service provider than the 5G telecommunications network.

4. The non-transitory computer-readable storage medium of claim 1, wherein the context of the UE comprises one or more of:
an international mobile subscriber identity (IMSI) assigned to the UE,
an identity of a mobility management entity (MME) controlling a connection between the UE and the 4G LTE telecommunications network,
security context of the UE,
UE network capability,
aggregate maximum bit rate (AMBR) configured for the UE,
selected core network operator identifier,
access point name (APN) restriction value indicative of a type of application data the UE is configured to send, or
an evolved packet system (EPS) bearer context.

5. The non-transitory computer-readable storage medium of claim 1, wherein the gNB is a first gNB, and wherein the instructions when executed further cause the system to:
receive a second communication indicating a request by the UE to transfer from:
(i) the communication session with the first gNB, to
(ii) a communication session with a second gNB associated with the 5G NR telecommunications network; and
in response to the second communication, transfer a second context of the UE for use by the second gNB, wherein the second context includes the IPv6 address assigned to the UE.

6. The non-transitory computer-readable storage medium of claim 1, wherein the instructions when executed further cause the system to:
receive a second communication indicating a request by a second UE to transfer from:
(i) a communication session with the gNB, to
(ii) a communication session with the eNB, in which the second UE is assigned an IPv6 address to enable communications by the second UE; and
in response to the second communication, transfer a second context of the second UE for use by the eNB, wherein the second context includes the IPv6 address assigned to the second UE.

7. The non-transitory computer-readable storage medium of claim 1, wherein the communication is received from the MME, and wherein the UE is idle when the request to transfer is generated.

8. The non-transitory computer-readable storage medium of claim 1, wherein the communication is received from the gNB, and wherein the UE is operating in an active data session when the request to transfer is generated.

9. The non-transitory computer-readable storage medium of claim 1, wherein transferring the context of the UE to the MME comprises generating a relocation request that includes the context.

10. A method comprising:
receiving a communication indicating a request by a mobile device to transfer from a communication session with a gNodeB (gNB) associated with a 5th Generation New Radio (5G NR) telecommunications network to a communication session with an eNodeB (eNB) associated with a 4th Generation Long-Term Evolution (4G LTE) telecommunications network,
wherein the mobile device is assigned an Internet protocol version 6 (IPv6) address to enable communications by the mobile device in a packet data unit (PDU) session within the 5G NR telecommunications network;
in response to the received communication, transmit a request for context of the mobile device to an accessibility and mobility management function (AMF) associated with the 5G NR telecommunications network;
configure the eNB using the context of the mobile device; and
notify the mobile device that the PDU session associated with the IPv6 address has an inactive status,
wherein the notification causes the mobile device to initiate an Internet protocol version 4 (IPv4) packet data network (PDN) session with a core network associated with the 4G LTE telecommunications network.

11. The method of claim 10, wherein the 4G telecommunications network and the 5G telecommunications network are operated by a same network service provider.

12. The method of claim 10, wherein the 4G telecommunications network is operated by a different network service provider than the 5G telecommunications network.

13. The method of claim 10, wherein the gNB is a first gNB, and wherein the method further comprises:
receive a second communication indicating a request by the mobile device to transfer from:
(i) the communication session with the first gNB, to
(ii) a communication session with a second gNB associated with the 5G NR telecommunications network; and
in response to the second communication, transfer a second context of the mobile device for use by the second gNB, wherein the second context includes the IPv6 address assigned to the mobile device.

14. The method of claim 10, further comprising:
receive a second communication indicating a request by a second mobile device to transfer from:
(i) a communication session with the gNB, to
(ii) a communication session with the eNB, in which the second mobile device is assigned an IPv6 address to enable communications by the second mobile device; and
in response to the second communication, transfer a second context of the second mobile device for use by the eNB, wherein the second context includes the IPv6 address assigned to the second mobile device.

15. The method of claim 10, wherein the communication is received from a mobility management entity (MME) associated with the 4G LTE telecommunications network, and wherein the mobile device is idle when the request to transfer is generated.

16. The method of claim 10, wherein the communication is received from the gNB, and wherein the mobile device is operating in an active data session when the request to transfer is generated.

17. The method of claim 10, wherein transferring the context of the mobile device to a mobility management entity (MME) associated with the 4G LTE telecommunications network comprises generating a relocation request that includes the context.

18. A system comprising:
    at least one hardware processor; and
    at least one non-transitory memory storing instructions, which, when executed by the at least one hardware processor, cause the system to:
        receive a communication indicating a request by user equipment (UE) to transfer from a communication session with a gNodeB (gNB) associated with a 5th Generation New Radio (5G NR) telecommunications network to a communication session with an eNodeB (eNB) associated with a 4th Generation Long-Term Evolution (4G LTE) telecommunications network,
            wherein the UE is operating in an active data session when the request to transfer is received, and
            wherein the UE is assigned an Internet protocol version 6 (IPv6) address to enable communications by the UE in a packet data unit (PDU) session within the 5G NR telecommunications network;
        transmit to a mobility management entity (MME) associated with the 4G LTE telecommunications network, a relocation request associated with the UE that does not include the IPv6 address, the relocation request causing the MME to notify the UE that the IPv6 PDU session is inactive and to facilitate initiation of an IP version 4 (IPv4) packet data network (PDN) session with a core network of the 4G LTE telecommunications network; and
        release the IPv6 address assigned to the UE.

19. The system of claim 18, wherein the gNB is a first gNB, and wherein the instructions when executed further cause the system to:
    receive a second communication indicating a request by the UE to transfer from:
        (i) the communication session with the first gNB, to
        (ii) a communication session with a second gNB associated with the 5G NR telecommunications network; and
    in response to the second communication, transfer a second context of the UE for use by the second gNB, wherein the second context includes the IPv6 address assigned to the UE.

20. The system of claim 18, wherein the instructions when executed further cause the system to:
    receive a second communication indicating a request by a second UE to transfer from:
        (i) a communication session with the gNB, to
        (ii) a communication session with the eNB, in which the second UE is assigned an IPv6 address to enable communications by the second UE; and
    in response to the second communication, transfer a second context of the second UE for use by the eNB, wherein the second context includes the IPv6 address assigned to the second UE.

* * * * *